Patented Mar. 26, 1929.

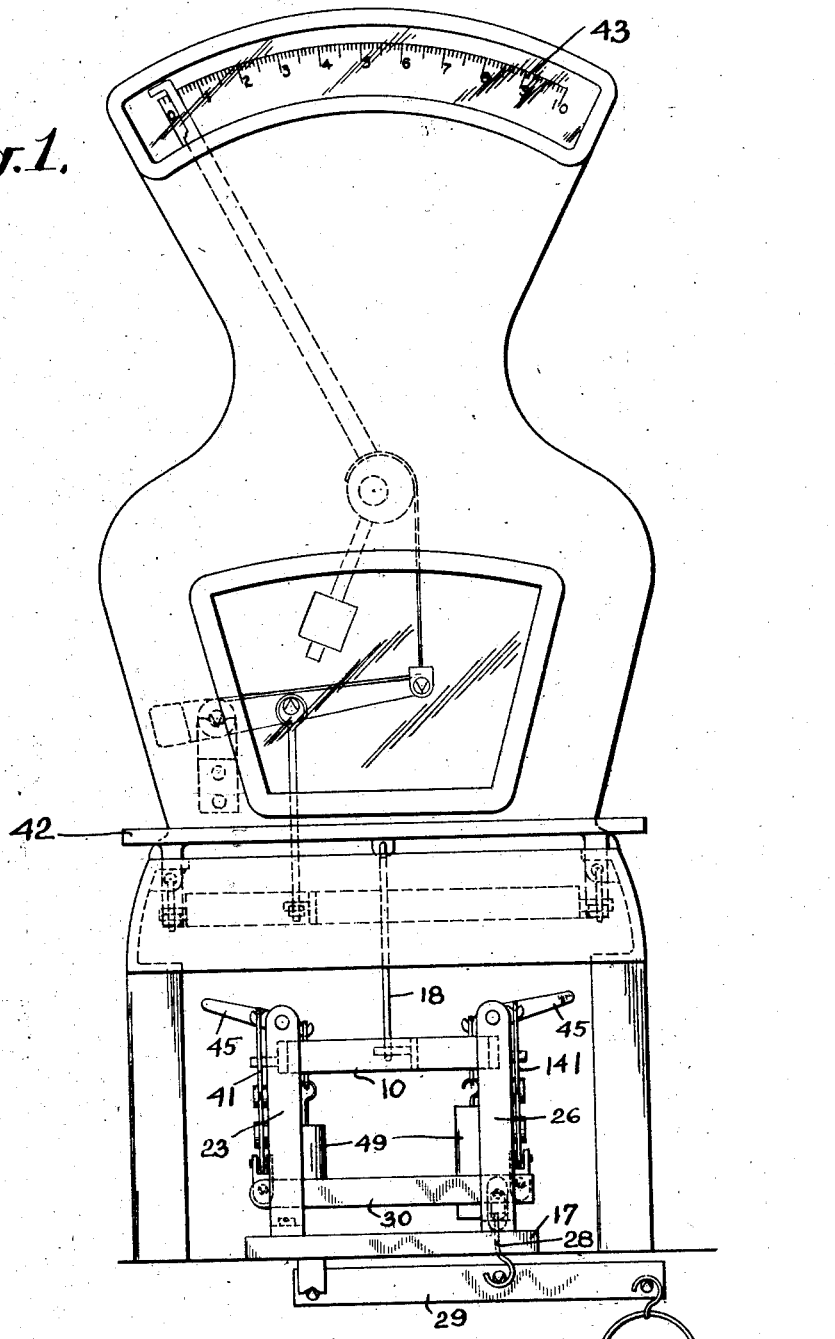

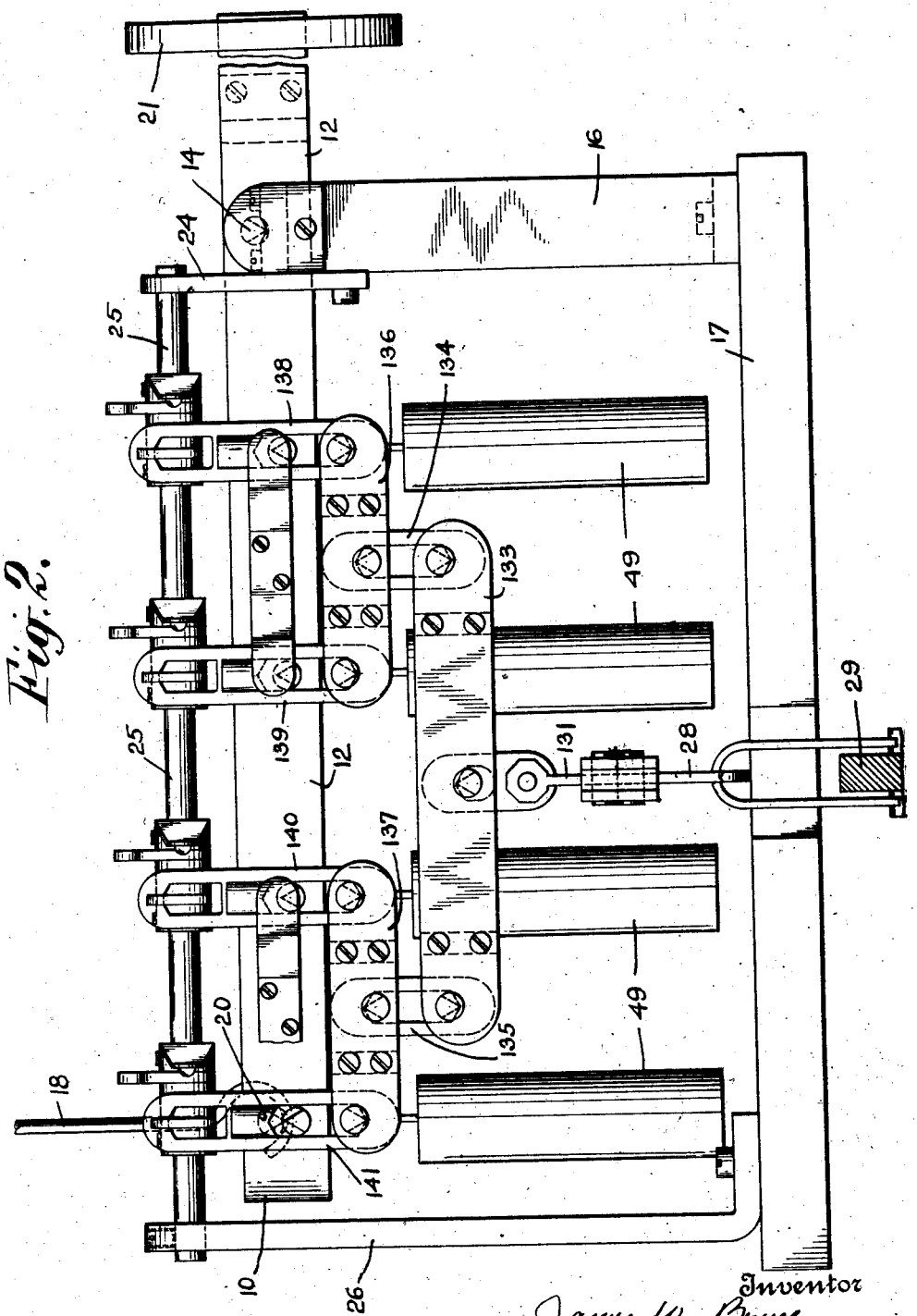

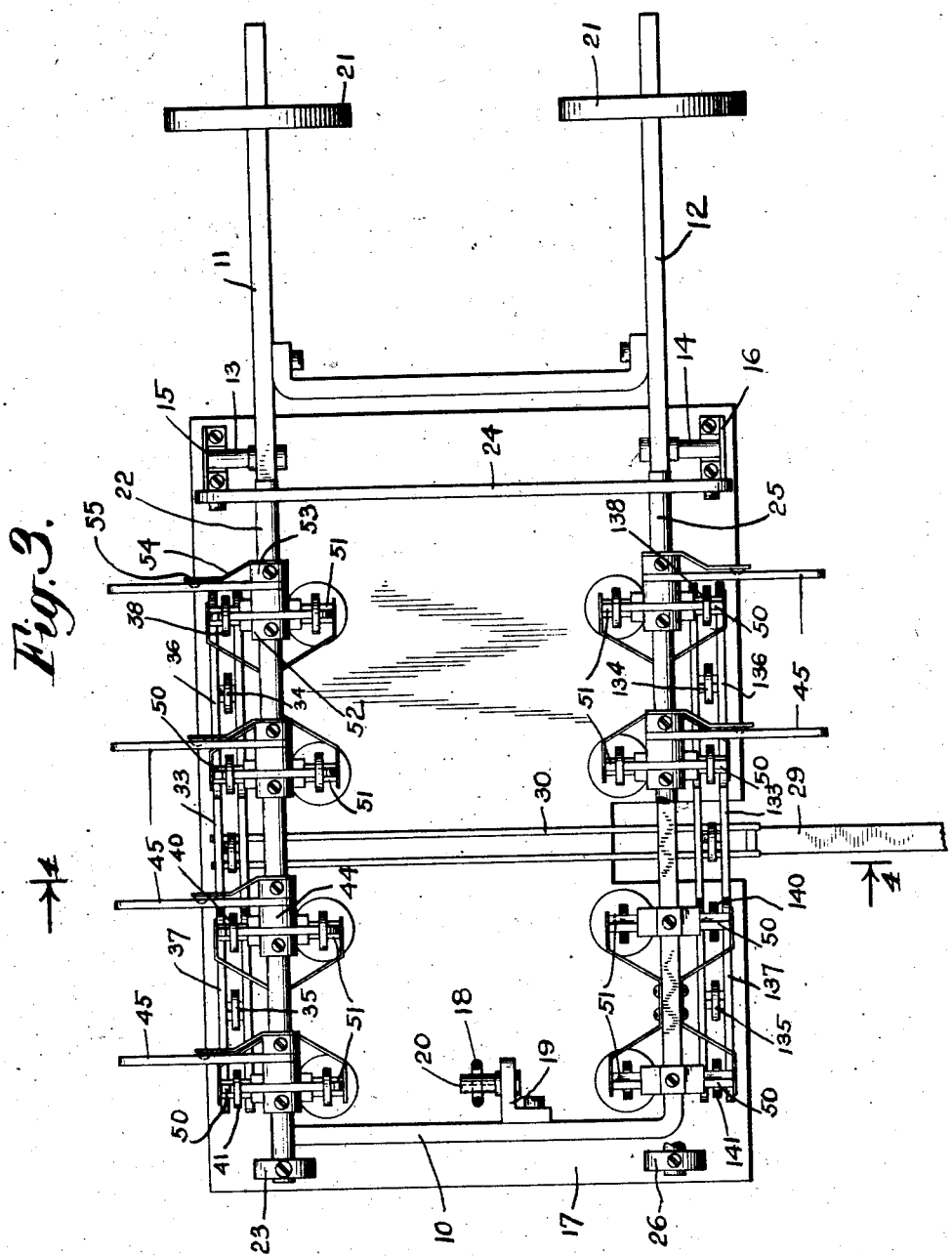

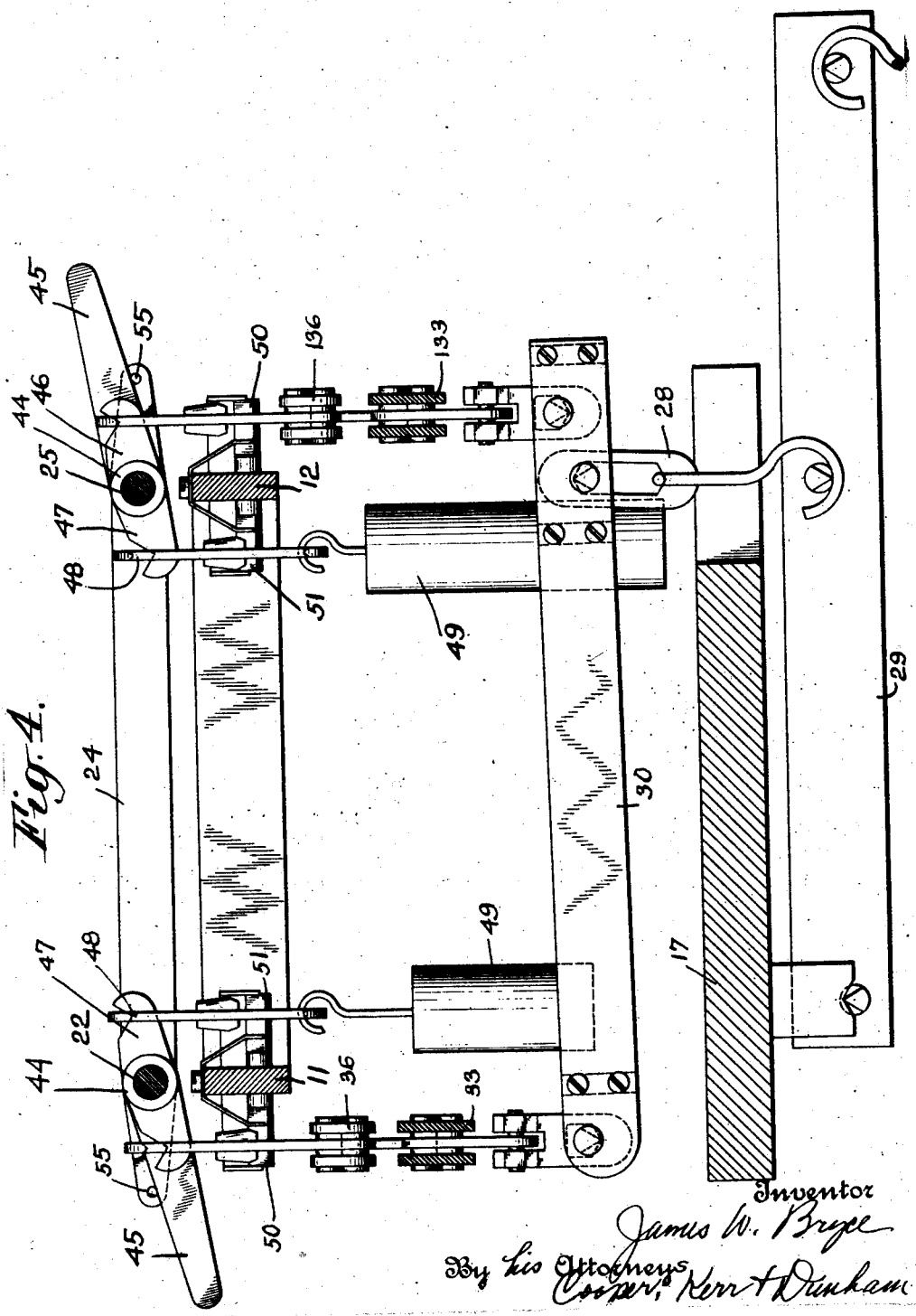

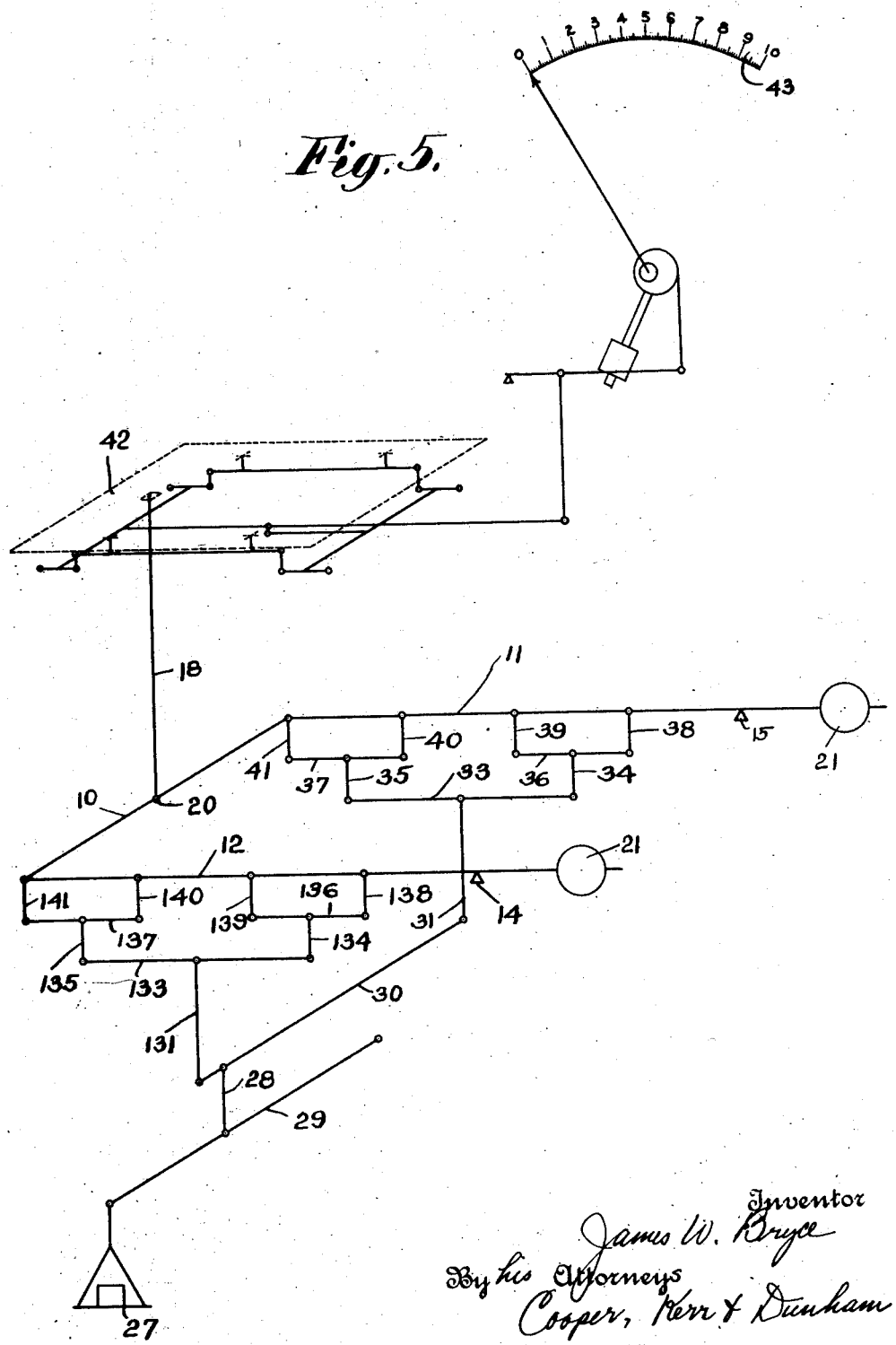

1,706,870

UNITED STATES PATENT OFFICE.

JAMES W. BRYCE, OF BLOOMFIELD, NEW JERSEY, ASSIGNOR TO DAYTON SCALE COMPANY, OF DAYTON, OHIO, A CORPORATION OF NEW JERSEY.

PRICE SCALE.

Application filed April 6, 1926. Serial No. 100,029.

This invention relates to scales, and more particularly to price-scales in which the weight of a commodity and the price per unit weight of such commodity may be multiplied together and the product thereof representing the cost may be indicated on a chart or scale.

Among the objects of this invention is to produce a factoring or multiple lever system adapted to be interposed between a load offsetting mechanism and a scale pan or platform whereby, depending upon the active or inactive relation of each of various levers within the system, desired factors may be introduced for obtaining different multiples of a load on the scale pan.

Another object of this invention is to provide readily accessible devices for varying the multiple of a load that is being transmitted through a multiple lever system so that any one or plurality of devices may be positioned to vary the active or inactive condition of the lever associated with any particular device.

Another object of the invention is to produce a multiple lever system which may be associated with any standard platform scale without effecting any permanent change in the platform scale and without rendering the platform scale useless for ordinary weighing operations.

Another object of this invention is to produce a factoring system which is capable of transmitting a large number of different factors over a large range without there existing any appreciable loss in precision while any particular factor throughout the entire range of available factors is being transmitted.

Another object of this invention is to produce a factoring system which is so flexible as to be capable of being extended to any desired range and to be adapted to be used with any standard of factors desired, for example, a monetary standard such as would be required of a factoring system wherein the various factors represented cost per unit of weight in foreign currency, and the mechanism or price-scale with which the system is to be combined is to be used in a country where pounds is the money standard.

Other objects will appear hereinafter in the specification and in the drawings, in which Fig. 1 is a front elevation of a platform scale with a factoring system associated therewith.

Fig. 2 is an elevation of the factoring system as viewed from the right of Fig. 1.

Fig. 3 is a plan view of the factoring system.

Fig. 4 is a vertical view of the factoring system on line 4—4 of Fig. 3.

Fig. 5 is a diagrammatic illustration of the factoring system as associated with a standard platform scale.

For simplifying the disclosure of my factoring system and its theory of operation I have chosen to describe and illustrate its application to a decimal money system wherein factors differing in increments of one unit, ranging from one unit to one hundred and ten units, may be introduced into the system at will. The range chosen is sufficient to convey a thorough understanding of the theory of the assembly or system and a description of a greater range of factors is refrained from being given because of the fact that such a description would entail description of similar linkage that would necessarily include repetitions of description of theory in an extended application without aiding to the understanding that may be had by an understanding of the decimal system herein described.

In order to use the least number of links for introducing factors covering a range extending from one unit to one hundred and ten units, the factors may be divided into two groups, one group being capable of obtaining variations by increments of one unit ranging from one to ten and the other group being capable of obtaining variations by increments of ten units ranging from ten to one hundred. A unit may be conveniently termed as representative of one cent, and, accordingly, the system to be described may be used with a price scale in computing the price of commodities ranging in price from one cent to one dollar and ten cents per unit weight, for example, per pound.

The main lever or member 10 is duplex in its form in that it has two parallel sides or arms 11, 12 which are rigidly connected to one another in the form of a U. Arm 11 will be described later as being associated with the obtaining of variations in rates of cents per pound, and arm 12 will be described later as being associated with the obtaining of variations in rates of tens of cents per pound. The lever member 10 is supported by a pair of knife edges, 13, 14, one of the knife edges extending from one of the parallel sides 11, 12 of the U-shaped lever and the other knife edge extending from the other parallel side. Each of these knife edges rests upon a bearing disposed at the top of individual posts 15, 16, which are firmly secured to a base plate 17. Member 10 is free to tilt on knife edges 14, 13, and is connected at the center of its forward or looped end directly to a load off-setting mechanism or, as in this present disclosure, to a scale platform of any standard scale by means of a link 18. Link 18 is disposed midway between sides 11 and 12. A bracket 19 extending from lever 10 has extending therefrom a knife edge 20 which accurately determines the length of the lever arms 11 and 12 of the U-shaped member. At the rear end of the U-shaped member and to the rear of posts 15, 16, are disposed counterweights 21 by the adjustment of which the weight of the U-shaped member 10 and link 18 may be accurately balanced.

Rigidly supported close to or above each of the parallel sides 11 and 12 is disposed a rod. Rod 22 over side 11 is supported at its front end by a standard 23 and is supported at its rear end by a bar 24 secured to posts 15 and 16. Rod 25 over side 12 is supported at its front end by a standard 26 and is supported at the rear end by bar 24. These rods 22 and 25 are for the purpose of supporting the ends of those factoring links of the factoring system which are not in use to affect the pull on link 18 during any one weighing operation, as will be described hereinafter.

In order to understand the different effects produced by selectively and variously introducing different factors into the factoring system, reference may be had to the diagrammatic showing of the factoring system in Fig. 5. The manner in which the value of the various factors is determined and the manner in which each of the factors may be introduced into the system will be best understood by applying a mass of known weight to a scale pan 27 and then tracing through the links comprising the system to see how the weight of this assumed mass is distributed so as to be able to cause four equal pulls on side lever 12 and four equal pulls on side lever 11, those pulls on side lever 11 being one-tenth of the amount of those pulls on side lever 12. Accordingly, if it be assumed that a mass of ten units of weight be placed upon scale pan 27, a force of 17.6 units will be exerted on a load sustaining link 28 as the result of the 17.6 to 10 ratio of lever 29. Link 28 is connected to beam 30 so as to divide the beam into two parts, whereby a force of 16 units will be exerted on link 131 and a force of one-tenth that amount, namely a force of 1.6 units, will be exerted on link 31. Link 131 is connected at the center of beam 133. Links 134 and 135 at the ends of beam 133 will each communicate a force of 8 units, the former connected to the center of beam 136 and the latter connected to the center of beam 137. Links 138 and 139 connected to beam 136 and link 140 connected to beam 137 are adapted to be connected to arm 12 at one-quarter, one-half, three-quarters the distance, respectively, between the line of knife-edges 13, 14 and knife edge 20, while link 141 may be connected to arm 12 at the full effective length of arm 12 determined by the position of knife edge 20. By this arrangement each of links 138, 139, 140 and 141 are capable of exerting a pull of 4 units. The forces transmitted and exerted by link 31, beam 33, links 34 and 35, beams 36 and 37 and links 38, 39, 40 and 41 will bear the same relations to each other as the forces transmitted and exerted by link 131, beam 133, links 134 and 135, beams 136 and 137 and links 138, 139, 140 and 141, except that the respective beams and links will be affected only one-tenth as great as the corresponding beam of link of the arrangement previously described in detail, i. e., links 38, 39, 40 and 41 each are capable of transmitting a pull of 0.4 unit when links 138, 139, 140 and 141 each are capable of transmitting a pull of 4.0 units. Hereinafter, these links will be referred to as factor links, and it is to be understood that the pull capable of being transmitted by any one of these links bears a constant ratio to the pull capable of being transmitted by any other one of these links independent of the weight of the mass on scale pan 27.

It is apparent from the foregoing description of the factoring system that various multiples of the weight of mass on scale pan 27 may be obtained by variously connecting the links 38, 39, 40, 41, 138, 139, 140 and 141 to the U-shaped member 10. Now, if the factor by which the weight on scale pan 27 is to be multiplied by represents cost per unit weight, the multiple obtained would represent the cost of the commodity on the pan. For example, factoring link 38 may be considered as representing a factor of $0.01, factoring link 39 as representing a factor of $0.02, it being capable of being attached to lever arm 11 at twice the distance that link 38 is disposed from fulcrum 13. It is apparent that links 40, 41, 138, 139, 140, and 141 are capable of transmitting factor values of $0.03, $0.04, $0.10, $0.20, $0.30 and $0.40, respectively. Thus, if link 138 alone is connected to lever member 10, a commodity on the scale pan 27 will be multiplied by $0.10 and if the weight of the commodity were only one pound the pointer would come to rest opposite "1" on the scale. If link 141 alone is connected to lever member 10, another commodity weighing one pound were placed upon the scale pan, the pointer would come to rest opposite "4" on the scale, indicating that the computed price is $0.40. With both factor links 138 and 141 connected to arm 12 and no factor links connected to arm 11, the reading of the pointer would be $0.50 when the commodity weighed equalled the weight of a pound. If there were two pounds weighed at $0.50 per pound factor links 138 and 141 would be connected to arm 12 and the pointer would indicate $1.00. The various factors or rates per unit of weight are additive, and if all of the factor links 138, 139, 140, 141, 38, 39, 40 and 41 be rendered active by connecting them to lever member 10, a multiple representing the product of the weight on the scale pan and the rate of $1.10 will be indicated by the pointer.

This factoring system may be directly associated with a standard platform scale by connecting link 18 with the platform 42. In such a case a decimal scale 43, marked with dollars and cents, if desired, could be used to read the exact computed value of the article weighed. Where the "1" on the scale indicates $1.00 this same "1" will serve to indicate the true weight of the article when the article is valued at $1.00 per pound. Hence, in order to read the true weight of any article the factor of $1.00 may be introduced into system and the pointer will indicate directly the weight in pounds.

For rendering any one of the factor links 138, 139, 140, 141, 38, 39, 40 and 41 in an active or inactive position, an individual member is provided for each link. The members for each link are similar and each member comprises a collar 44 and an arm 45 adapted to be manipulated to rock the collar on a rod (22, 25). Extending from the collar are two arms 46 and 47, arm 46 having a notch therein adapted to engage the loop end of a factor link, and arm 47 likewise having a notch adapted to engage the loop 48 of a compensating weight 49. Knife edges 50 from which the factor links may be suspended also extend through their respective arms 11 and 12 so as to form pivots 51 upon which compensating weights may be affixed. Arms 46 and 47 are so disposed that when arm 45 is rocked to an upper position, the factor link related thereto is raised from an active position on knife edge 50 to an inactive position and compensating weight 49 is lowered so that it is totally suspended from pivot 51 (Fig. 4). The purpose of each compensating weight is to compensate for the dead weight pull transmitted through a related factor link when the related factor link is placed in an inactive position.

The collars 52 and 53 are placed, one on each side of collar 44 so as to maintain collar 44 in a proper position, and a spring arm 54 extends from one of these collars. This arm has a raised portion 55 which serves to keep arm 45 in its adjusted position and thereby maintain a compensating weight or a factor link, as the case may be, out of operative relation with the lever arms of the U-shaped member (Fig. 4).

It will be understood that, as in other mechanisms of the character described, the balancing of parts and use of anti-friction pivots are desirable for obtaining accurate computations and that the present disclosure is such as to enable an ordinary mechanic to obtain the desired results.

The subject matter of my invention has been described as applied to a practical form of apparatus in that the apparatus disclosed may be used where the class of commodities that are to be weighed may vary in value from one cent to one dollar and ten cents per pound or per unit weight. The form of mechanism described embodies the theory of the invention in a simple form, but the theory is adaptable to be embodied in a mechanism for computing prices in other monetary systems. For example, for the English system, one arm of a U-shaped member could be divided at points at 1, 2, 3, 4 and 10 units from a fulcrum, and the other arm could be divided at points at 1, 2, 3 and 6 units from a fulcrum. The first mentioned arm would represent the shillings rate and the second mentioned arm would indicate the pence rate. A comparison of the U-shaped member for the decimal system and the one for the English system would be as follows:

|  | Decimal (U. S.) | English |
|---|---|---|
| Lever arm 12 | Tens of cents rate | Shillings rate. |
| Length of arm 12 | 4 units | 10 units. |
| Respective lengths of factor levers. | 1, 2, 3, 4 units | 1, 2, 3, 4, 10 units. |
| Lever arm 11 | Cents rate | Pence rate. |
| Length of arm 11 | 4 units | 6 units. |
| Respective lengths of factor levers. | 1, 2, 3, 4 units | 1, 2, 3, 6 units. |
| Ratio of pulls on factor links. | Arm 12 : arm 11 = 10 : 1. | Arm 12 : arm 11 = 12 : 1 |

There are twelve pence in a shilling so the force distributing linkage would be laid out so that each of the factor links adapted to be connected to the first mentioned arm (12) would be able to exert a pull twelve times greater than each of the factor links adapted to be connected to the second mentioned arm (11) or the pence arm. This would be one form of the embodiment of my system in the English system.

The nature of my invention is of such a flexible character that it is capable of a wide variation and relationship of parts without departure from the nature and principle thereof, and I do not restrict myself unessentially to the foregoing or other particulars, but contemplate such alterations and modifications within the scope of the appended claims as may be found advisable.

I claim:

1. A factor determining system comprising, in combination, a lever having two arms of predetermined lengths, a group of links adapted to be associated with one of said two arms, another group of links adapted to be associated with the other one of said two arms, and linkage connecting both groups of links including a load transmitting member having provisions for causing a single load applied thereto to be distributed to the two groups of links so that one group of links may transmit forces ten times greater than the other group of links.

2. A factor determining system comprising, in combination, a lever having two arms of predetermined lengths, a plurality of links adapted to be associated with said lever, each link being disposed at a predetermined distance along said lever with one group of said links adjacent one arm of said lever and another group of said links adjacent the other arm of said lever, a load distributing beam, and links connecting said beam with each of said groups of links.

3. A factor determining system comprising, in combination, a lever having two arms of predetermined lengths, a plurality of links adapted to be associated with said lever, each link being disposed at a predetermined distance along said lever with one group of said links adjacent one arm of said lever and another group of said links adjacent the other arm of said lever, linkage connected to each of said groups of links, and a load transmitting member connected to said linkage whereby the load transmitted through the first named group of links is ten times greater than that transmitted through the second named group of links.

4. A factor determining system comprising, in combination, a lever having two arms of predetermined lengths, a plurality of links of which each link is disposed equidistantly along one arm of said lever, a plurality of links of which each link is disposed equidistantly along the other arm of said lever, load distributing means connected to each of said links, and means associated with each link for placing it in active relation to said lever so as to transmit its pull as a factor on said lever.

5. A factor determining system comprising, in combination, a lever having two arms of predetermined lengths, a plurality of links of which each link is disposed equidistantly along one arm of said lever, a plurality of links of which each link is disposed equidistantly along the other arm of said lever, a load sustaining link, and linkage intermediate said load sustaining link and said links for transmitting equal loads to each of said links disposed along the first named arm of said lever and equal loads of a lesser amount to each of said links disposed along the second named arm of said lever.

6. A factor determining system comprising, in combination, a lever having two arms of predetermined lengths, a plurality of links of which each link is disposed equidistantly along one arm of said lever, a plurality of links of which each link is disposed equidistantly along the other arm of said lever, a load sustaining link, linkage intermediate said load sustaining link and said links for transmitting equal loads to each of said links disposed along the first named arm of said lever and equal loads of a lesser amount to each of said links disposed along the second named arm of said lever, and means for selectively placing any one of said links in cooperative relation with said lever.

7. A factor determining system comprising, in combination, a lever having two arms of predetermined lengths, a plurality of links of which each link is disposed equidistantly along one arm of said lever, a plurality of links of which each link is disposed equidistantly along the other arm of said lever, load distributing means connected to each of said links, means for placing any one or number of said links in active relation with said lever, and means for compensating for the dead weight transmitted through each link which is not placed in active relation with said lever.

8. A factor determining system comprising, in combination, a lever having two arms of predetermined lengths, a plurality of links of which each link is disposed equidistantly along one arm of said lever, a plurality of links of which each link is disposed equidistantly along the other arm of said lever, a load sustaining link, linkage intermediate said load sustaining link and said links for transmitting equal loads to each of said links disposed along the first named arm of said lever and equal loads of a lesser amount to each of said links disposed along the second named arm of said lever, means for placing any one or a number of said links in active relation with said lever, and means for compensating for the dead weight transmitted through each link which is not placed in active relation with said lever.

9. A factor determining system comprising, in combination, a lever having two arms of predetermined lengths, a group of links adapted to be associated with one of said two arms, the links of said group dividing the length of said arm in equal portions, a second group of links adapted to be associated with the other of said two arms, the links of the second group dividing the length of said arm in equal portions, linkage connecting both of said groups of links so that each of the links in the first named group sustains equal loads and each of the links in the second named group sustains equal loads of one-tenth the amount of each load sustained by a link of the first group, and means for placing any one or number of said links in active position on said lever whereby their individual efforts on said lever are additive when more than one link is placed in active position.

10. A factor determining system comprising, in combination, a lever having two arms of predetermined lengths, a group of links adapted to be associated with one of said two arms, the links of said group dividing the length of said arm in equal portions, a second group of links adapted to be associated with the other of said two arms, the links of the second group dividing the length of said arm in equal portions, linkage connecting both of said groups of links so that each of the links in the first named group sustains equal loads and each of the links in the second named group sustains equal loads of one-tenth the amount of each load sustained by a link of the first group, means associated with each of said links equal to the dead weight pull of its associated link, means to remove said means from coactive relation with said lever when its associated link is placed in coactive relation with said levers.

11. In an apparatus of the class described, in combination, a load offsetting mechanism, a lever having connections with said load offsetting mechanism, a plurality of links disposed at equal intervals along said lever, load transmitting linkage for causing equal pulls to be transmitted to each link, a weight associated with each link adapted to be placed on said lever opposite an associated link to compensate for the dead weight transmitted at each link, means to place a link in active position on said lever and to remove said associated weight, and an indicating hand controlled by said load offsetting mechanism and by the pull exerted by any one or number of links in active position on said lever.

12. In an apparatus of the class described, in combination, a load off-setting mechanism, a multi-arm lever having connections with said load offsetting mechanism, a group of links for each arm of said multi-arm lever, means associated with each link for placing it in active or inactive relation with its associated arm of said multi-arm lever whereby the pull of said multi-arm lever on said load offsetting mechanism may be varied, and compensating means associated with each link for compensating for the dead weight pull of a link when said link is in an inactive position in relation to said multi-arm lever.

13. In an apparatus of the class described, in combination, a load offsetting mechanism, a multi-arm lever having connections with said load offsetting mechanism, a group of links for each arm of said multi-arm lever, the links of each group being disposed at predetermined intervals within the length of their associated arm of said multi-arm lever, means on said lever adapted to support said links, and means adapted to be operated by a user for placing any one or plurality of said links on said first named means for affecting the pull on said load offsetting mechanism according to the number of links supported by said lever during a weighing operation.

14. In an apparatus of the class described, in combination, a load offsetting mechanism, a multi-arm lever having connections with said load offsetting mechanism, a group of links for each arm of said multi-arm lever, the links of each group being disposed at predetermined intervals within the length of their associated arm of said multi-arm lever, means on said lever adapted to support said links, linkage connecting the various groups of links for transmitting different pulls on each group of links, load sustaining means connected to said linkage, and means for selectively placing any number of said links and of any group on respective supporting means whereby the position of said offsetting mechanism during a weighing operation is affected by a factor determined by the particular link or links placed on any arm of said multi-arm lever.

15. A factor determining system comprising, in combination, a multi-arm lever, a plurality of links for each arm of said multi-arm lever, said links being spaced along the arms of said multi-arm lever, load distributing linkage for causing equal force distribution among the links along any one arm of said multi-arm lever and for causing unequal force distribution as between the links along any one arm and the links along any other arm, load sustaining means connected to said linkage, and means to connect any one of said links to said multi-arm lever whereby a load carried by said load sustaining means and linkage may be caused to variably affect the load on said multi-arm lever depending upon the links connected thereto.

16. In an apparatus of the class described, the combination comprising, a load offsetting mechanism, a lever having connections with said load offsetting mechanism, a plurality of supporting pivots spaced at various distances from the fulcrum of said lever, a load sustaining mechanism, and linkage intermediate said lever and said load sustaining mechanism, said linkage including a plurality of individual means disposed along said lever, one for each of said supporting pivots each of which individual means is adapted to apply and distribute a portion of the load sustaining mechanism to the supporting pivots.

17. In an apparatus of the class described, the combination comprising, a load offsetting mechanism, a lever having connections with said load offsetting mechanism, a load sustaining mechanism, and linkage intermediate said lever and said load sustaining mechanism, said linkage having members for applying force from the load sustaining mechanism to said lever at various distances from the fulcrum of said lever.

18. The combination set forth in claim 17 in which means are provided for associating and disassociating the members with the lever, at will.

19. In an apparatus of the class described, the combination comprising, a load offsetting mechanism, a lever connected therewith, a plurality of pivots on said lever disposed at different distances from the fulcrum of said lever, load sustaining means, and means intermediate said load sustaining means and said lever comprising a plurality of members arranged to be selectively brought into and out of coaction with said pivots on said lever.

20. In an apparatus of the class described, the combination comprising, a load offsetting mechanism, a lever connected therewith, load sustaining mechanism, means intermediate said load offsetting mechanism and said load sustaining means for variously distributing forces capable of affecting said load sustaining means, members connected to said means and disposed along said lever at various distances from the fulcrum of said lever, a plurality of supporting members spaced oppositely to said members on said lever, and means for bringing any one or more of said members into cooperative relation with its corresponding supporting element.

21. In an apparatus of the class described, the combination comprising, a load offsetting mechanism, a lever having connections with said load offsetting mechanism, said lever having a plurality of arms on the same side of its fulcrum, members disposed at various distances along each of said arms, a load sustaining mechanism, and linkage intermediate said load sustaining mechanism and said members.

22. The combination set forth in claim 21 in which means is provided for selectively connecting or disconnecting said members with said lever.

23. In an apparatus of the class described, the combination comprising, a load offsetting mechanism, a multi-arm lever having connections with said load offsetting mechanism, a group of members for each arm, said members being differently spaced from the fulcrum of said lever, bearing members carried by said arms, one for each of said members, load sustaining mechanism, linkage connected with said members and with said load sustaining mechanism whereby a force capable of affecting said load sustaining mechanism may be variously distributed to said members through said linkage.

24. In an apparatus of the class described, the combination comprising, a load offsetting mechanism, a lever connected therewith, a plurality of bearing members variously spaced from the fulcrum of said lever, a like number of members for contacting with said bearing members, load sustaining mechanism, and means intermediate said load sustaining mechanism and said lever comprising four members arranged to be selectively and conjointly brought into relation with said bearing members, whereby a force applied to said load sustaining mechanism may be made to affect said load offsetting mechanism for ten different ratios.

25. In an apparatus of the class described, the combination comprising, a load offsetting mechanism, a scale lever connected thereto, a lever, a load supporting mechanism intermediate said scale lever and said lever, load sustaining means, and factoring mechanism including means for applying variable factored combinations of forces to said lever, said mechanism being intermediate said load sustaining means and said lever.

26. In an apparatus of the class described, the combination comprising, scale mechanism including a load supporting platform, a lever connected therewith, load sustaining mechanism, factoring mechanism intermediate said lever and said load sustaining mechanism, said factoring mechanism including linkage and members adapted to be associated with said lever, and means for selectively associating said members with said lever.

In testimony whereof I hereto affix my signature.

JAMES W. BRYCE.